(12) United States Patent
Gallagher et al.

(10) Patent No.: US 6,547,112 B2
(45) Date of Patent: Apr. 15, 2003

(54) CRUTCH AND CANE HOLDER SYSTEM

(76) Inventors: Charles E. Gallagher, P.O. Box 924, Springerville, AZ (US) 85938; Edith L. Gallagher, P.O. Box 924, Springerville, AZ (US) 85938

( * ) Notice: Subject to any disclaimer, the term of this patent is extended or adjusted under 35 U.S.C. 154(b) by 0 days.

(21) Appl. No.: 09/815,107

(22) Filed: Mar. 22, 2001

(65) Prior Publication Data
US 2002/0134808 A1 Sep. 26, 2002

(51) Int. Cl.[7] ............................................. B60R 9/00
(52) U.S. Cl. ..................... 224/407; 224/401; 224/553
(58) Field of Search ............................... 224/553, 401, 224/407, 274; D3/10, 11

(56) References Cited

U.S. PATENT DOCUMENTS

| | | | | |
|---|---|---|---|---|
| 4,300,706 A | * | 11/1981 | Hendrick et al. | 180/210 |
| 4,659,099 A | * | 4/1987 | Malone | 108/44 |
| 4,718,555 A | * | 1/1988 | Amberg | 206/518 |
| 5,842,615 A | * | 12/1998 | Goodness | 224/485 |
| 6,179,180 B1 | * | 1/2001 | Walker | 224/401 |
| 6,202,773 B1 | * | 3/2001 | Richey et al. | 180/6.5 |
| 6,382,484 B1 | * | 5/2002 | Savant | 224/282 |

* cited by examiner

Primary Examiner—Stephen K. Cronin
Assistant Examiner—Maerena W. Brevard
(74) Attorney, Agent, or Firm—Martin L. Stoneman

(57) ABSTRACT

A crutch and cane holder attachment for attaching to the rear vertical surface portion, below the seat and preferably just above a rear deck, of a motorized wheelchair-scooter, of the type used to transport a disabled person. Such motorized wheelchair-scooters are typically provided in grocery stores and other retail establishments for use by disabled persons. The adjustable crutch and cane holder will accommodate storage of crutches or canes regardless of the angle of attachment of the holder to the motorized wheelchair-scooter or the slope of the wheelchair seat-back. This adjustability provides that the crutches will not hit the user in the head or interfere with the seat-back when utilizing a seat that swivels. The low mounting height provides for a minimal distance above the floor that the crutches or cane must be lifted to accommodate storage.

12 Claims, 2 Drawing Sheets

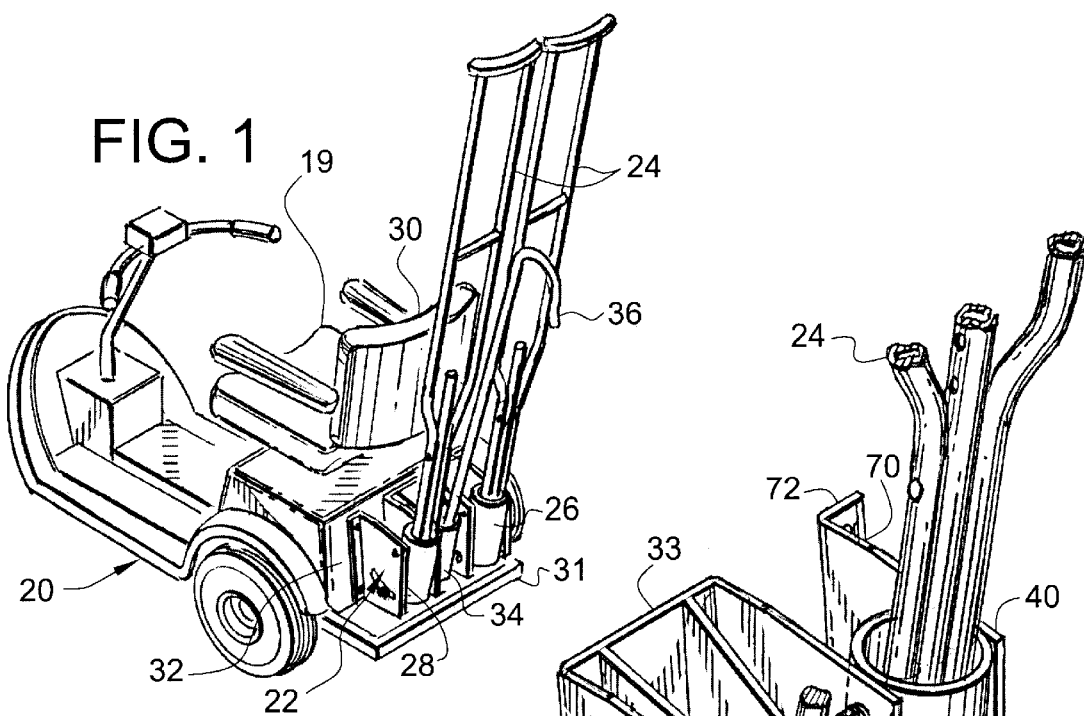
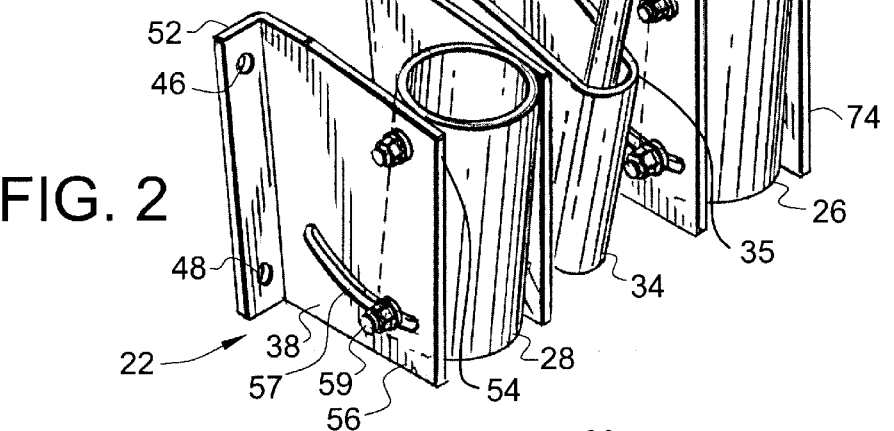
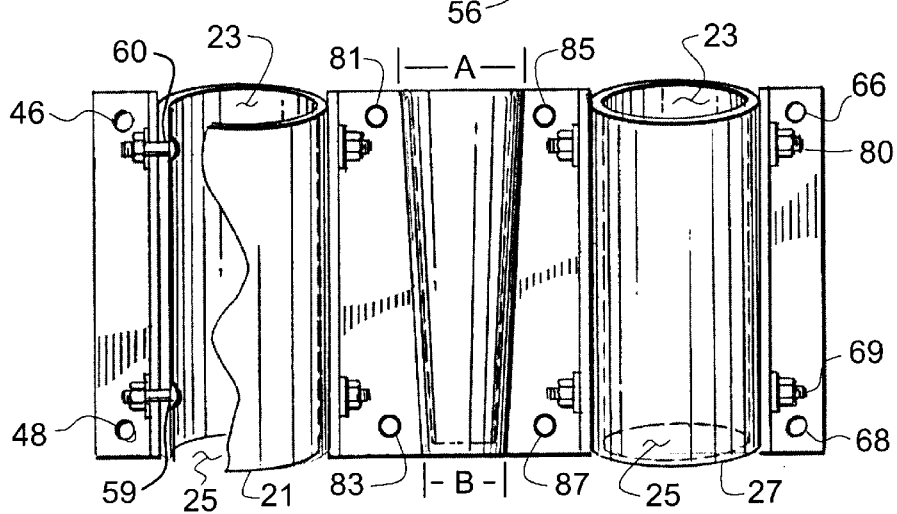

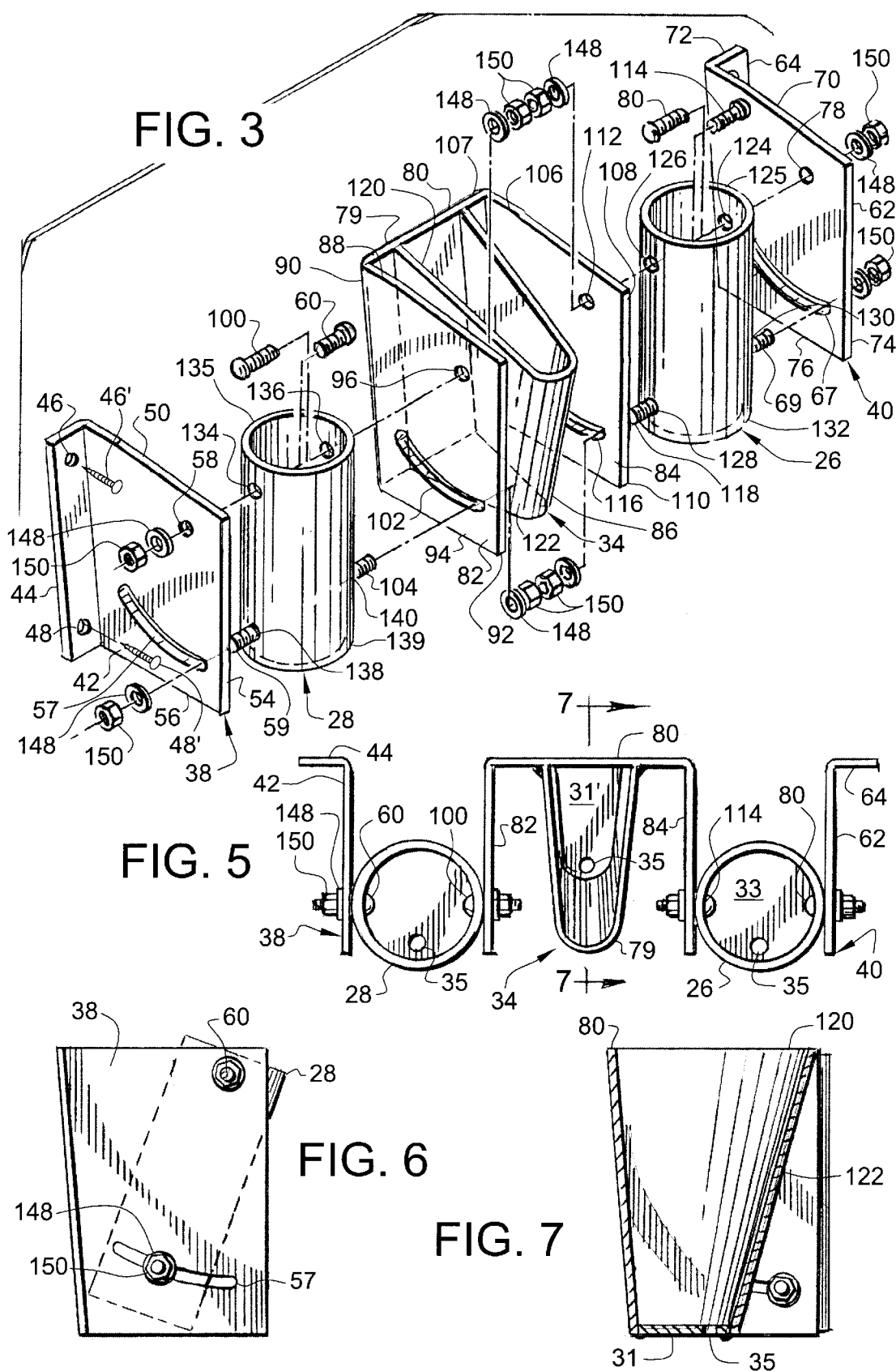

CRUTCH AND CANE HOLDER SYSTEM

BACKGROUND

This invention relates to providing a system for improved storage of canes and crutches, particularly in conjunction with motorized wheelchair-scooters.

Typically, a disabled person who requires the assistance of crutches or a cane has a need to store these items when they are utilizing a motorized wheelchair-scooter, such as may be found in many retail stores and grocery stores. The motorized wheelchair-scooters allow for the disabled person to be seated and have mobility while shopping. At the present time, it is customary that canes or crutches are left at a service desk or carried along on the motorized wheelchair-scooter with great difficulty. In some cases, a bag may be attached to the back of the chair portion to accommodate holding the crutches or cane; however, use of such bags requires lifting the crutches or cane to a height of several feet, which may be difficult or impossible for the disabled person to accomplish.

OBJECTS OF THE INVENTION

A primary object and feature of the present invention is to provide a system for holding crutches and canes on a motorized wheelchair-scooter. It is a further object and feature of the present invention to provide such a system which is easy to use and which requires only minimal lifting of the crutches or cane off of the ground for storage in the holder. Yet another object and feature of the present invention is to provide such a system which provides for an adjustable crutch holder accommodating storage of crutches regardless of the angle of attachment of the holder to the motorized wheelchair-scooter or the slope of the wheelchair seat-back; this adjustability provides an advantage in that the crutches will not hit the user in the head while seated or while using a motorized wheelchair-scooter with a swiveling seat.

A further primary object and feature of the present invention is to provide such a system which is efficient, inexpensive, and handy. Other objects and features of this invention will become apparent with reference to the following descriptions.

SUMMARY OF THE INVENTION

According to a preferred embodiment of the present invention, there is provided a holder system, for holding a lower portion of a walking assistor, having one lower leg, structured and arranged to attach to a rear substantially-vertical surface portion of a motorized wheelchair-scooter, having a seat, of the type used to transport a disabled person, comprising, in combination: at least one holder, having an upper aperture, structured and arranged to hold at least one such lower portion of at least one such lower leg; and an attachment structured and arranged to attach such holder to the rear substantially-vertical surface portion of the motorized wheelchair-scooter; wherein such holder system is structured and arranged so that such upper aperture, when attached to the motorized wheelchair-scooter, has a height lower than a seat of the motorized wheelchair-scooter. It also provides such a system further comprising an adjuster structured and arranged to adjust an angle of such holder when attached to the rear substantially-vertical surface portion of the motorized wheelchair-scooter. And, it provides such a system wherein such at least one holder comprises at least two holders, having at least two upper apertures, each such upper aperture being structured and arranged to receive at least one such lower portion of at least one such walking assistor. It also provides such a system wherein such holder further comprises at least one substantially round cylindrical receiver.

Further, it provides such a system wherein such upper aperture, when attached to the motorized wheelchair-scooter, has a height less than about one and one-half feet above the ground. And, it provides such a system wherein such at least two holders comprise: at least two upper respective apertures and at least two respective lower apertures, at least two respective bottoms structured and arranged to block, respectively, such at least two lower apertures such that the walking assistors cannot fall through such lower apertures when held by such upper apertures; and a drain in each of such at least two bottoms structured and arranged to allow liquids to pass through such bottoms. Still further, it provides such a system wherein such holder is substantially rigid. And, it provides such a system wherein such adjuster comprises an adjustment range from about vertical to about 45 degrees upward and outward.

Even further, it provides such a system wherein such attachment further comprises a mechanical attachment comprising at least two screws structured and arranged to connect such holder to such rear substantially-vertical surface portion of the motorized wheelchair-scooter. It also provides such a system wherein such adjuster further comprises: a bolt attachment on a side of at least one holder; and at least one slot located adjacent such side of such at least one holder, each such slot being structured and arranged to cooperate with one such bolt attachment on such side of such holder. And, it provides such a system further comprising a motorized wheelchair-scooter having a seat and attached with such holder.

According to another preferred embodiment of the present invention, there is provided a holder system, for holding a lower portion of a walking assistor, having one lower leg, structured and arranged to attach to a rear substantially-vertical surface portion of a motorized wheelchair-scooter having a seat, of the type used to transport a disabled person, comprising, in combination: at least one holder, having an upper aperture, structured and arranged to hold at least one such lower portion of at least one such lower leg; an attachment structured and arranged to attach such holder to the rear substantially-vertical surface portion of the motorized wheelchair-scooter; and an adjuster structured and arranged to adjust an angle of such holder when attached to the rear substantially-vertical surface portion of the motorized wheelchair-scooter.

Additionally, it provides such a system wherein such adjuster further comprises: a bolt attachment on a side of at least one holder; at least one slot located adjacent such side of such at least one holder, each such slot being structured and arranged to cooperate with one such bolt attachment on such side of such holder; and an adjustment range from about vertical to about 45 degrees upward and outward; and wherein such adjustment is set at about 40 degrees. Moreover, it provides such a system wherein such at least one holder comprises at least two holders, having at least two upper apertures, each such upper aperture being structured and arranged to receive at least one such lower portion of at least one such walking assistor. And, it provides such a system wherein such holder further comprises at least one substantially round cylindrical receiver. Also, it provides such a system wherein such holder further comprises at least one cane receiver structured and arranged to hold at least one cane at a fixed angle of about a 20-degree angle upward and outward from vertical. And, it provides such a system further comprising a motorized wheelchair-scooter having a seat and attached with such holder.

According to yet another preferred embodiment of the present invention, there is provided a holder system for holding a lower portion of a walking assistor having one lower leg structured and arranged to attach to a rear substantially-vertical surface portion of a motorized wheelchair-scooter having a seat, of the type used to transport a disabled person, comprising, in combination: a first cylindrical receiver; a left end structured and arranged to attach to the rear substantially-vertical surface portion of a motorized wheelchair-scooter and to such first cylindrical receiver; a second cylindrical receiver; a cane-holder portion structured and arranged to attach to such first and second cylindrical receivers and comprising a cane-holder; and a right end structured and arranged to attach to the rear substantially-vertical surface portion of a motorized wheelchair-scooter and to such second cylindrical receiver. It also provides such a system further comprising a set of adjusters structured and arranged to adjust an angle of at least one such cylindrical receiver from about vertical to about 45 degrees upward and outward.

BRIEF DESCRIPTION OF THE DRAWINGS

FIG. 1 is a perspective view of a motorized wheelchair-scooter with the crutch and cane holder system attached, according to a preferred embodiment of the present invention.

FIG. 2 is a perspective view of the crutch and cane holder according to a preferred embodiment of the present invention.

FIG. 3 is an exploded perspective view of the crutch and cane holder according to a preferred embodiment of the present invention.

FIG. 4 is a front view, partially in section, of the crutch and cane holder according to a preferred embodiment of the present invention.

FIG. 5 is a plan view of the crutch and cane holder according to a preferred embodiment of the present invention.

FIG. 6 is a side view of the crutch and cane holder according to a preferred embodiment of the present invention.

FIG. 7 is a sectional view through the section 7—7 of FIG. 5.

DETAILED DESCRIPTION OF A PREFERRED EMBODIMENT OF THE INVENTION

FIG. 1 is a perspective view of a motorized wheelchair-scooter 20 with the crutch and cane holder 22 attached, according to a preferred embodiment of the present invention. In a preferred embodiment, the crutch and cane holder 22 is preferably utilized by being attached to a motorized wheelchair-scooter 20. Such motorized wheelchair-scooters 20 are typically provided in grocery stores and other retail establishments for use by disabled persons. Typically, motorized wheelchair-scooters 20 do not provide for storage of crutches 24 or canes 36 (each embodying herein a walking assistor having one lower leg). Storage of these items is customarily accomplished by leaving them at a service desk or other storage area. As illustrated in FIG. 1, in the present preferred embodiment, the crutches 24 are stored away in two round cylindrical receivers (each having an upper aperture, as shown), a left cylindrical receiver 28, and a right cylindrical receiver 26 (embodying herein a first cylindrical receiver and a second cylindrical receiver). The receivers 26 and 28 are adjustable in angle such that when the crutches 24 are stored in the receivers 26 and 28, they will not interfere with the seat-back 30. Some models of motorized wheelchair-scooters 20 have adjustable and swivel-type seats, which would hit the crutches 24 if the receivers 26 and 28 were always in a fixed vertical position. Preferably, the crutch and cane holder 22 is attached to a rearmost substantially-vertical surface 32 of the motorized wheelchair-scooter 20, slightly above the rear deck 31, and below the seat 19, as shown (this arrangement embodying herein wherein such holder system is structured and arranged so that such upper aperture, as shown, when attached to the motorized wheelchair-scooter, has a height lower than a seat of the motorized wheelchair-scooter). Preferably, the rear deck 31 is used in conjunction with the crutch and cane holder 22 to prevent the crutches 24 or cane 36 from falling through the crutch and cane holder 22. Preferably, as illustrated in FIG. 4, the receivers 26 and 28 have an opening 23 large enough to accept the crutch 24 leg diameter at the top 21 (this arrangement embodying herein at least two holders, having at least two upper apertures, each such upper aperture being structured and arranged to receive at least one such lower portion of at least one such walking assistor) and an opening 25 (embodying herein at least two respective lower apertures) at the bottom 27, also large enough to accept the crutch 24 leg diameter. As will be further described below, if no rear deck 31 is present, another embodiment utilizing an integral bottom blocking element 29 and 33 (shown only in FIG. 5 and embodying herein at least two respective bottoms structured and arranged to block, respectively, such at least two lower apertures such that the walking assistors cannot fall through such lower apertures when held by such upper apertures) on the crutch and cane holder 22 may be utilized. Further, there are a variety of such wheelchair-scooters 20 available, and the rearmost vertical surface 32 (embodying herein a rear substantially-vertical surface portion of a motorized wheelchair-scooter) may be located in different positions relative to the seat-back 30 and slightly off vertical. Those skilled in the art may readily engineer, under appropriate circumstances, other attachments for the instant device, even where such rear surfaces are rounded or with other shapes, provided, preferably, that such rear surface has at least one substantially vertical surface portion for involvement in such attachment. In addition, as mentioned above, some wheelchair-scooters 20 have seats 19 (embodying herein a motorized wheelchair-scooter having a seat) that swivel to allow for easier loading and unloading by the disabled passenger. For the above reasons, it is preferable to utilize an adjustable feature, comprising as shown a bottom slot and nut to set a bottom swivel distance and an upper nut about which a receiver may swivel (see FIGS. 3 and 6 and corresponding descriptions, for example), for the receivers 26 and 28 (embodying herein an adjuster structured and arranged to adjust an angle of such holder when attached to the rear substantially-vertical surface portion of the motorized wheelchair-scooter). Preferably, the receivers 26 and 28 need only be adjusted from about 0 degrees off the vertical surface 32 to about 40 degrees outward from the vertical surface 32 (shown in FIG. 6 and embodying herein wherein such adjustment is set at about 40 degrees). More angle than about 45 degrees may cause the crutches 24 to fall out of the receivers 26 and 28, or provide a hazard by protruding too far a distance out from the wheelchair-scooter 20. Further, receivers 26 and 28 are made utilizing only a minimal height required to hold the crutches 24. Preferably, the distance to lift the crutches 24 for storing them is minimal, preferably less than one and one-half feet from the ground and no more than about six and one-half inches from the height of the rear deck 31 (this arrangement embodying herein that such upper aperture, when attached to the motorized wheelchair-scooter, has a height less than about one and one-half feet above the ground).

In addition to holding crutches 24, the crutch and cane holder 22 also provides a middle portion 34 (embodying herein a cane-holder portion structured and arranged to attach to such first and second cylindrical receivers and comprising a cane-holder), which is in the approximate shape of a holster in appearance. Preferably, middle portion 34 is slightly sloped both in height and in width, as shown. The preferable slope is about 20 degrees from back 33 to front 35 (embodying herein wherein such holder further comprises at least one cane receiver structured and arranged to hold at least one cane at a fixed angle of about a 20-degree angle upward and outward from vertical), thus typically holding a cane 36 with little or no adjustment necessary. Preferably, the distance to lift the cane 36 for storing is minimal, preferably less than one and one-half feet from the ground and no more than about six and one-half inches from the height of the rear deck 31.

The following discussion is with reference to FIGS. 2, 3 and 4. FIG. 2 is a perspective view of the crutch and cane holder 22, according to a preferred embodiment of the present invention. FIG. 2 further illustrates the assembled crutch and cane holder 22. FIG. 3 is an exploded perspective view of the crutch and cane holder 22 and illustrates the individual parts, which will be explained in greater detail below. FIG. 4 is a front view, partially in section, of the crutch and cane holder 22. Preferably, the crutch and cane holder 22 is comprised of five basic parts and connecting hardware. The five basic parts are a left end 38, a right end 40, a middle portion 34, and two receivers 26 and 28. The connecting hardware is preferably comprised of flat head threaded machine bolts (e.g. bolt 60), which will allow the bolt portion to pass through an aperture, but not the head of the bolt, and size-matched lock washers 148 and nuts 150, which will threadably attach to the bolts. Those knowledgeable in the art will understand and appreciate that, in appropriate circumstances, other types of suitable connectors may be selected without detracting from the present invention.

Preferably, left end 38 comprises a larger first vertical planar surface 42, resembling a fin, and a smaller second vertical planar surface 44, which is equal in height and protrudes to the left and perpendicular to the first vertical planar surface 42, as shown. Preferably, the second vertical planar surface 44 is a short piece, preferably about one inch wide, just wide enough to provide holes 46 and 48 for mounting hardware such as screws 46' and 48' (this arrangement embodying herein a left end structured and arranged to attach to the rear substantially-vertical surface portion of a motorized wheelchair-scooter and to such first cylindrical receiver; and wherein such attachment further comprises a mechanical attachment comprising at least two screws structured and arranged to connect such holder to such rear substantially-vertical surface portion of the motorized wheelchair-scooter). In a preferred embodiment, larger first vertical planar surface 42 is about six and one-half inches in height, about four and three-quarters inches long at the top 50 from back 52 to front 54, and about three and three-quarters inches long at the bottom 56 from back 52 to front 54. The first vertical planar surface 42 also comprises a bolt aperture 58 located about one and one-half inches from the top 50 and about one and one-eighth inches from the front 54. Preferably, bolt aperture 58 is just large enough to accommodate bolt 60 (see FIG. 3). In addition, the first vertical planar surface 42 also comprises a slotted bolt aperture 57. Preferably, slotted bolt aperture 57 is located starting at about one and one-half inches from the bottom 56, and about one and one-eighth inches from the front 54, as shown. Preferably, slotted bolt aperture 57 is elongated in an arc for a distance of about two inches such that it will allow receiver 28 to be angled up to about 45 degrees (embodying herein wherein such adjuster further comprises: a bolt attachment on a side of at least one holder; at least one slot located adjacent such side of such at least one holder, each such slot being structured and arranged to cooperate with one such bolt attachment on such side of such holder; and embodying herein wherein such adjuster comprises an adjustment range from about vertical to about 45 degrees upward and outward). Preferably, slotted bolt aperture 57 will accommodate bolt 59, as shown in FIG. 3.

Preferably right end 40 (embodying herein a right end structured and arranged to attach to the rear substantially-vertical surface portion of a motorized wheelchair-scooter and to such second cylindrical receiver) comprises a larger first vertical planar surface 62, resembling a fin, and a smaller second vertical planar surface 64, which is equal in height and protrudes to the right and perpendicular to the first vertical planar surface 62, as shown. Preferably, the second vertical planar surface 64 is a short piece, preferably about one inch wide, just wide enough to provide holes 66 and 68 (shown in FIG. 4) for mounting hardware, such as screws (not shown at this spot, but an arrangement like that for similar holes 46 and 48 and screws 46' and 48'). In a preferred embodiment, larger first vertical planar surface 62 is about six and one-half inches in height, about four and three-quarters inches long at the top 70 from back 72 to front 74, and about three and three-quarters inches long at the bottom 76 from back 72 to front 74. The first vertical planar surface 62 also comprises a bolt aperture 78 located about one and one-half inches from the top 70, and about one and one-eighth inches from the front 74. Preferably, bolt aperture 78 is just large enough to accommodate bolt 80 (see FIG. 3). In addition, the first vertical planar surface 62 also comprises a slotted bolt aperture 67. Preferably, slotted bolt aperture 67 is located starting at about one and one-half inches from the bottom 76, and about one and one-eighth inches from the front 74, as shown. Preferably, slotted bolt aperture 67 is elongated in an arc for a distance of about two inches such that it will allow receiver 26 to be angled up to about 45 degrees. Preferably, slotted bolt aperture 67 will accommodate bolt 69, as shown in FIG. 3.

Preferably, middle portion 34 comprises a U-shaped portion 79, further comprising a back 80, a left wing 82, a right wing 84, and a center tapered holster portion 86. The back 80, as shown, is preferably a solid back of about four and three-quarters inches wide, and about six and one-half inches in height; it has holes 81, 83, 85, and 87 (shown in FIG. 4) for mounting hardware, such as screws (not shown at this spot, but an arrangement like that for similar holes 46 and 48 and screws 46' and 48'). Left wing 82 preferably extends perpendicular from the left end of back 80, with a preferred dimension of about six and one-half inches in height, about four and three-quarters inches long at the top 88 from back 90 to front 92, and about three and three-quarters inches long at the bottom 94 from back 90 to front 92. Left wing 82 further comprises a bolt aperture 96 located about one and one-half inches from the top 88, and about one and one-eighth inches from the front 92. Preferably, bolt aperture 96 is just large enough to accommodate bolt 100 (see FIG. 3). In addition, the left wing 82 also comprises a slotted bolt aperture 102. Preferably, slotted bolt aperture 102 is located starting at about one and one-half inches from the bottom 94, and about one and one-eighth inches from the front 92, as shown. Preferably, slotted bolt aperture 102 is elongated in an arc for a distance of about two inches such that it will allow receiver 26 to be angled up to about 45 degrees. Preferably, slotted bolt aperture 102 will accommodate bolt 104, as shown in FIG. 3.

Right wing 84 preferably extends perpendicular from the right end of back 80, with a preferred dimension of about six and one-half inches in height, about four and three-quarters inches long at the top 106 from back 107 to front 108, and about three and three-quarters inches long at the bottom 110 from back 107 to front 108. Right wing 84 further comprises a bolt aperture 112 located about one and one-half inches from the top 106, and about one and one-eighth inches from the front 108. Preferably, bolt aperture 112 is just large enough to accommodate bolt 114 (see FIG. 3). In addition, the right wing 84 also comprises a slotted bolt aperture 116. Preferably, slotted bolt aperture 116 is located starting at about one and one-half inches from the bottom 110, and about one and one-eighth inches from the front 108, as shown. Preferably, slotted bolt aperture 116 is elongated in an arc for a distance of about two inches such that it will allow receiver 26 to be angled up to about 45 degrees. Preferably, lotted bolt aperture 116 will accommodate bolt 118, as shown in FIG. 3.

Preferably, integral to the back 80 is center-tapered holster portion 86. Illustrated further in FIG. 6 and FIG. 7, center-tapered holster portion 86 is preferably shaped like a holster, open at both ends, with a slightly sloping top 120. The top 120 preferably slopes at about a 20 degree angle. In a preferred embodiment, the holster portion 86 is about one and three-quarters wide at the top 120 along the back 80 (seen as dimension A in FIG. 4), and about one and one-quarter wide at the top 120 along the front 122 (seen as dimension B in FIG. 4). Preferably, the holster portion 86 is about six and one-half inches in height along the back 80, and about six and one-quarter inches in height along the front 122. Under appropriate circumstances, other combinations of slope and size might suffice to approriately hold the cane 36. Preferably, the described embodiment will allow for minimal effort to raise the cane 36 in order to utilize the holster portion 86 and store the cane 36. It should be noted that although the preferred embodiment is to use a hollow center-tapered holster portion 86, if the motorized wheelchair-scooter 20 does not have a rear deck 31, then a bottom blocking element 31' (preferably including a drain 35) would be preferably installed on the holster portion 86.

Receivers 26 and 28 are identical in appearance and comprise two right round hollow cylinders, as shown. Preferably, receivers 26 and 28 are at least two and one-half inches in inner diameter in order to accommodate the majority of crutch sizes. Preferably, receivers 26 and 28 are about five and three-quarters inches in height, about a minimal height required to adequately hold the crutches from falling out. It should be noted that although the preferred embodiment is to use hollow cylinders, if the motorized wheelchair-scooter 20 does not have a rear deck 31, then another preferred embodiment is to insert or otherwise integrally attach a bottom blocking element 29 and 33 (shown only in FIG. 5), which would be preferably installed on the bottom of receivers 26 and 28 along with a drain hole 35 (embodying herein a drain in each of such at least two bottoms structured and arranged to allow liquids to pass through such bottoms) in each blocking element 29 and 33. Receiver 26 has two bolt apertures 124 and 126 along the top 125, arranged to match-up with bolt aperture 78 and bolt aperture 112. In addition, receiver 26 preferably has two bolt apertures 128 and 130 along the bottom 132 arranged to match-up with slotted bolt aperture 67 and slotted bolt aperture 116. Receiver 28 has two bolt apertures 134 and 136 along the top 135, arranged to match-up with bolt aperture 58 and bolt aperture 96. In addition, receiver 26 preferably has two bolt apertures 138 and 140 along the bottom 139 arranged to match-up with slotted bolt aperture 57 and slotted bolt aperture 102, as shown (embodying herein a set of adjusters structured and arranged to adjust an angle of at least one such cylindrical receiver from about vertical to about 45 degrees upward and outward).

Reference is now made to FIG. 4 and FIG. 5 with continued reference to FIG. 2 and FIG. 3. FIG. 4 is a front view, partially in section, of the crutch and cane holder 22 fully assembled, according to a preferred embodiment of the present invention. FIG. 5 is a plan view of the crutch and cane holder 22, also fully assembled. FIG. 5 further illustrates the crutch and cane holder 22 when fully assembled. The assembly of the crutch and cane holder 22 is preferably accomplished by inserting the appropriate bolts into the appropriate apertures and securing the bolts with nuts 150 and washers 148, as shown. Those knowledgeable in the art will appreciate the simplicity of the design and easily understand the assembly. For example, receiver 26 is secured to right end 40 by inserting bolt 80 through bolt aperture 124 and aperture 80, then attaching washer 148 and nut 150. It is further attached by inserting bolt 69 through slotted bolt aperture 130 and slotted bolt aperture 67, then attaching washer 148 and nut 150. Receiver 26 is secured to right wing 84 by inserting bolt 114 through bolt aperture 126 and aperture 112, then attaching washer 148 and nut 150 to secure the bolt 114. It is further attached by inserting bolt 118 through aperture 128 and slotted bolt aperture 116, then attaching washer 148 and nut 150 to secure the bolt 118. Preferably, receiver 28 is secured to left end 38 by inserting bolt 60 through bolt aperture 134 and aperture 58, then attaching washer 148 and nut 150. It is further attached by inserting bolt 59 through slotted bolt aperture 138 and slotted bolt aperture 57, then attaching washer 148 and nut 150. Receiver 28 is secured to left wing 82 by inserting bolt 100 through bolt aperture 136 and aperture 96, then attaching washer 148 and nut 150 to secure the bolt 114. It is further attached by inserting bolt 104 through aperture 140 and slotted bolt aperture 102, then attaching washer 148 and nut 150 to secure the bolt 118. In the above described manner, all five basic parts (left end 38, a right end 40, a middle portion 34, and two receivers 26 and 28) are connected, as shown.

The preferred overall dimensions of the crutch and cane holder 22 is about twelve inches wide by about six and one-half inches high, by about four and three-quarters inches deep. The preferred material for the five basic parts comprising a left end 38, a right end 40, a middle portion 34, and two receivers 26 and 28, is aluminum. In appropriate circumstances, other suitable rigid materials may be utilized by those knowledgeable in the art (embodying herein wherein such holder is substantially rigid).

Although applicant has described applicant's preferred embodiments of this invention, it will be understood that the broadest scope of this invention includes such modifications as diverse shapes, sizes and materials. Such scope is limited only by the below claims as read in connection with the above specification.

Further, many other advantages of applicant's invention will be apparent to those skilled in the art from the above descriptions and the below claims.

What is claimed is:

1. A holder system, for holding a lower portion of a walking assistor, having one lower leg, structured and arranged to attach to a rear substantially-vertical surface portion of a motorized wheelchair-scooter, having a seat, used to transport a disabled person, comprising:
   a) at least one holder, having an upper aperture, structured and arranged to hold at least one such lower portion of at least one such lower leg; and
   b) an attachment structured and arranged to attach said holder to the rear substantially-vertical surface portion of the motorized wheelchair-scooter;
   c) wherein said holder system is structured and arranged so that said upper aperture, when attached to the motorized wheelchair-scooter, has a height lower than a seat of the motorized wheelchair-scooter; and
   d) an adjuster structured and arranged to adjust an angle of said holder when attached to the rear substantially-vertical surface portion of the motorized wheelchair-scooter;
   e) wherein said holder further comprises at least one substantially round cylindrical receiver;
   f) wherein said upper aperture, when attached to the motorized wheelchair-scooter, has a height less than about one and one-half feet above the ground;
   g) wherein said at least one holder comprises at least two holders, wherein said at least two holders comprise,
      i) at least two upper respective apertures and at least two respective lower apertures,
      ii) at least two respective bottoms structured and arranged to block, respectively, said at least two lower apertures such that the walking assistors cannot fall through said lower apertures when held by said upper apertures, and
      iii) a drain in each of said at least two bottoms structured and arranged to allow liquids to pass through said bottoms.

2. A holder system, for holding a lower portion of a walking assistor, having one lower leg, structured and arranged to attach to a rear substantially-vertical surface portion of a motorized wheelchair-scooter, having a seat, used to transport a disabled person, comprising:
   a) at least one holder, having an upper aperture, structured and arranged to hold at least one such lower portion of at least one such lower leg; and
   b) an attachment structured and arranged to attach said holder to the rear substantially-vertical surface portion of the motorized wheelchair-scooter;
   c) wherein said holder system is structured and arranged so that said upper aperture, when attached to the motorized wheelchair-scooter, has a height lower than a seat of the motorized wheelchair-scooter; and
   d) an adjuster structured and arranged to adjust an angle of said holder when attached to the rear substantially-vertical surface portion of the motorized wheelchair-scooter;
   e) wherein said holder further comprises at least one substantially round cylindrical receiver;
   f) wherein said upper aperture, when attached to the motorized wheelchair-scooter, has a height less than about one and one-half feet above the ground;
   g) wherein said holder is substantially rigid;
   h) wherein said adjuster comprises an adjustment range from about vertical to about 45 degrees upward and outward.

3. The holder system according to claim 2 wherein said adjuster further comprises:
   a) a bolt attachment on a side of at least one holder;
   b) at least one slot located adjacent said side of said at least one holder, each said slot being structured and arranged to cooperate with one said bolt attachment on said side of said holder.

4. A holder system, for holding a lower portion of a walking assistor, having one lower leg, structured and arranged to attach to a rear substantially-vertical surface portion of a motorized wheelchair-scooter, having a seat, used to transport a disabled person, comprising:
   a) at least one holder, having an upper aperture, structured and arranged to hold at least one such lower portion of at least one such lower leg; and
   b) an attachment structured and arranged to attach said holder to the rear substantially-vertical surface portion of the motorized wheelchair-scooter;
   c) wherein said holder system is structured and arranged so that said upper aperture, when attached to the motorized wheelchair-scooter, has a height lower than a seat of the motorized wheelchair-scooter; and
   d) an adjuster structured and arranged to adjust an angle of said holder when attached to the rear substantially-vertical surface portion of the motorized wheelchair-scooter;
   e) wherein said at least one holder comprises at least two holders, having at least two upper apertures, each said upper aperture being structured and arranged to receive at least one such lower portion of at least one such walking assistor;
   f) wherein said attachment further comprises a mechanical attachment comprising at least two screws structured and arranged to connect said holder to said rear substantially-vertical surface portion of the motorized wheelchair-scooter.

5. A holder system, for holding a lower portion of a walking assistor, having one lower leg, structured and arranged to attach to a rear substantially-vertical surface portion of a motorized wheelchair-scooter, having a seat, used to transport a disabled person, comprising:
   a) at least one holder, having an upper aperture, structured and arranged to hold at least one such lower portion of at least one such lower leg; and
   b) an attachment structured and arranged to attach said holder to the rear substantially-vertical surface portion of the motorized wheelchair-scooter;
   c) wherein said holder system is structured and arranged so that said upper aperture, when attached to the motorized wheelchair-scooter, has a height lower than a seat of the motorized wheelchair-scooter; and
   d) an adjuster structured and arranged to adjust an angle of said holder when attached to the rear substantially-vertical surface portion of the motorized wheelchair-scooter;
   e) wherein said at least one holder comprises at least two holders, having at least two upper apertures, each said upper aperture being structured and arranged to receive at least one such lower portion of at least one such walking assistor; and
   f) a motorized wheelchair-scooter having a seat and attached with said holder.

6. A holder system, for holding a lower portion of a walking assistor, having one lower leg, structured and arranged to attach to a rear substantially-vertical surface portion of a motorized wheelchair-scooter having a seat, used to transport a disabled person, comprising:
   a) at least one holder, having an upper aperture, structured and arranged to hold at least one such lower portion of at least one such lower leg;
   b) an attachment structured and arranged to attach said holder to the rear substantially-vertical surface portion of the motorized wheelchair-scooter; and
   c) an adjuster structured and arranged to adjust an angle of said holder when attached to the rear substantially-vertical surface portion of the motorized wheelchair-scooter;
   d) wherein said adjuster further comprises,
      i) a bolt attachment on a side of at least one holder,
      ii) at least one slot located adjacent said side of said at least one holder, each said slot being structured and arranged to cooperate with one said bolt attachment on said side of said holder, and
      iii) an adjustment range from about vertical to about 45 degrees upward and outward.

7. The holder system according to claim 6 wherein said adjustment is set at about 40 degrees.

8. The holder system according to claim 6 wherein said at least one holder comprises at least two holders, having at least two upper apertures, each said upper aperture being structured and arranged to receive at least one such lower portion of at least one such walking assistor.

9. The holder system according to claim 7 wherein said holder further comprises at least one substantially round cylindrical receiver.

10. The holder system according to claim 9 wherein said holder further comprises at least one cane receiver structured and arranged to hold at least one cane at a fixed angle of about a 20-degree angle upward and outward from vertical.

11. The holder system according to claim 8 further comprising a motorized wheelchair-scooter having a seat and attached with said holder.

12. A holder system for holding a lower portion of a walking assistor having one lower leg structured and arranged to attach to a rear substantially-vertical surface portion of a motorized wheelchair-scooter having a seat, used to transport a disabled person, comprising:
   a) a first cylindrical receiver;
   b) a left end structured and arranged to attach to the rear substantially-vertical surface portion of a motorized wheelchair-scooter and to said first cylindrical receiver;
   c) a second cylindrical receiver;
   d) a cane-holder portion structured and arranged to attach to said first and second cylindrical receivers and comprising a cane-holder; and
   e) a right end structured and arranged to attach to the rear substantially-vertical surface portion of a motorized wheelchair-scooter and to said second cylindrical receiver; and
   f) a set of adjusters structured and arranged to adjust an angle of at least one said cylindrical receiver from about vertical to about 45 degrees upward and outward.

* * * * *